United States Patent [19]

Blauert

[11] 3,803,346

[45] Apr. 9, 1974

[54] CIRCUIT ARRANGEMENT FOR THE TRANSFORMATION OF DIRECT CURRENT TELEGRAPHY SIGNALS

[75] Inventor: Hans Joachim Blauert, Munchen, Germany

[73] Assignee: Siemens Aktiengesellschaft, Berlin and Munich, Germany

[22] Filed: Apr. 28, 1971

[21] Appl. No.: 138,169

[30] Foreign Application Priority Data

May 4, 1970 Germany .......................... 2021754

[52] U.S. Cl. ............... 178/2 R, 178/4.1 R, 307/262

[51] Int. Cl. ............................ H04l 5/14, H03r 3/26

[58] Field of Search ........... 178/4.1 R, 4.1 A, 4.1 B, 178/4.1 C, 3, 2, 79, 26 R, 53 A; 179/18 AF; 307/262, 289

[56] References Cited

UNITED STATES PATENTS

| | | | |
|---|---|---|---|
| 3,629,507 | 12/1971 | Worrall | 178/79 |
| 2,820,089 | 1/1958 | Schouten et al. | 178/4.1 R |
| 3,172,952 | 3/1965 | Lentz | 307/262 |
| 3,619,667 | 11/1971 | Gerlach | 307/289 |
| 3,639,785 | 2/1972 | Moriyasu | 307/262 |
| 3,359,433 | 12/1967 | Thauland | 307/262 |
| 3,619,659 | 11/1971 | Meyer | 307/263 |
| 3,610,962 | 10/1971 | Keene | 307/262 |
| 3,593,169 | 7/1971 | Markow | 307/262 |

FOREIGN PATENTS OR APPLICATIONS

| | | | |
|---|---|---|---|
| 1,089,803 | 9/1960 | Germany | 178/2 R |
| 1,052,447 | 3/1959 | Germany | 178/2 R |

*Primary Examiner*—Thomas A. Robinson

[57] ABSTRACT

A circuit arrangement for converting single current, direct current telegraphy signals into double current signals is described. The double current signals operate a double current telegraphy transmission device. The input of a bistable trigger stage is connected in parallel to two connected resistances, which form part of a bridge circuit. The other part of the bridge circuit is formed by a subscriber station. An impedance transformation stage connects the resistances to the bistable trigger circuit.

The bistable trigger circuit is symmetrically constructed from a pair of transistor circuits, each said transistor having a feedback connection from its output to the input of the other transistor. The latter transistors switch through the potential of an operating source, depending on the polarity of the voltage difference applied to the inputs, to one of the outputs of the trigger circuit in such a way that direct current of changing direction appears at output loads.

7 Claims, 5 Drawing Figures

CIRCUIT ARRANGEMENT FOR THE TRANSFORMATION OF DIRECT CURRENT TELEGRAPHY SIGNALS

BACKGROUND OF THE INVENTION

The invention relates to a circuit arrangement for conversion of direct current telegraphy signals, and particularly for the conversion of a single current signal coming in over a two wire line from a subscriber station into a double current signal suitable for the control of a double current transmission circuit.

In telegraphy systems the transmissions on subscriber circuit lines generally are one way-single current signals. In contrast office lines or long distance lines are operated with double current signals in two way circuits. The transformation between the two types of signals takes place by means of conversion circuits in the exchanges.

Customarily, conversion circuits generally use electro-magnetic relays. FIG. 1 shows a known circuit of this type in simplified form. The subscriber station shown in simplified form comprises a teletype-writer F*s*M with receiving magnet EM and sending contact S*k*. This teletypewriter is connected over a two wire line ZL and a line supplementary resistance RL to the conversion circuit US of the exchange. The significant component parts of such a conversion circuit are the sender relay A and the receiving relay B with accompanying switching contacts *ab*. The sending relay A has two windings AI and AII. The second winding AII serves in conjunction with a matching circuit RN to create a flow of changing direction or alternating current in the direction of the relay A corresponding to the single current signal coming in over the line ZL. The matching circuit is thereby variably developed in its resistance value for the purpose of matching individual subscribers. Depending on the current circulation through the winding AI, double current signals are given off through the switching contact a to the outgoing line path. Double current signals which reach the relay B bring about the opposite, single current signals on the two wire line leading to the subscriber through short circuit keying over switching contact *b*. During the keying a holding direct current flows over the line substitute resistance RH. A capacitance branch with the holding capacitor CH brings about a current during the switch over phase.

Recently, in place of polarized relays, contactless electronic circuits have been frequently used. Such so-called electronic relays, with which the invention may advantageously be utilized, are known from inter alia, the German Gebrauchsmuster No. 1945240. Their use, however, makes a circuit modification necessary. A circuit arrangement according to FIG. 2 is used, wherein the electronic receiving relay is illustrated in simplified form as contact *b*. In place of the relay windings AI and AII, the conversion circuit contains the resistances R1 and R2 to which the control input of the electronic sending relay AE is connected in parallel over a low pass filter L, C. The voltage drop brought about in these resistances through the line current $I_L$ or the simulation current $I_n$ changes polarity corresponding to the single current signals coming in over the two wire line ZL. The LC member serves to flatten the edges of the current signals defined by the voltages at the resistance bridge and reaching the input of the electronic relay AE, and thus, makes possible the adjustment of the matching resistance RN by line ZL. In addition the LC-member brings about a suppression of short disturbance impulses and reduces interference distortions.

The values of the input current required for line current-fed electronic telegraphy relays can be reached, however, only with difficulty by such a resistance bridge. On the other hand the resistances must not be too high in value, so that the loss with line length is not too large and the relatively low non-linear input resistance of the electronic relay remains without disturbing influence. On the other hand the resistances should have high values, so that when current flows through the input of the relay, as a result of a strong flattening of the signal, the contact dwell time in between switching positions does not become too large. A large dwell time causes excessive distortion. In single current keying large switching times results in a lengthening of the start polar impulses. Further in local transmission, that is single current transmission, the danger arises that the relays in both directions will go into the middle position, which leads to an extinction of the connection. Finally, under some circumstances, for certain line types and line lengths this can lead to feedback of oscillations.

SUMMARY OF THE INVENTION

The invention is based on the problem of finding a useable solution for the conversion of direct current telegraphy signals, especially single current signals into double current signals, suitable for the control of a double current transmission circuit. Using the solution according to the invention transmission quality should be significantly enhanced.

The following requirements are fulfilled by the circuit arrangement according to the invention:

1. Bistable behavior,
2. High input sensitivity with large input resistance and good decoupling of the currents in the input circuit,
3. Small inherent current requirement from direct current source TB with sufficient control currents given off at the output,
4. No danger of short circuits, that is no overloading with its bad effect on the stability required for conversion circuits, as a result of short circuits in the input current circuits, and
5. Justification of the additional circuitry expense for switching through savings at other points.

The circuit arrangement according to the invention is distinguished in that the inputs of a bistable trigger stage are connected in parallel to the resistances in the branches of a conventional bridge circuit comprising the subscriber station circuit and a simulation current circuit over a symmetrical impedance member serving for the flattening of the signals and over an impedance transformation stage connected following the impedance member. The impedance transformer stage consists of similarly developed circuits each associated with one of the resistances in the bridge branches, which circuits contain transistors with the transistor bases being directly connected with the switching points common to the operating current source TB and the resistances. The bistable trigger stage is symmetrically constructed of transistors alternately back coupled over resistances. The transistors, depending upon the polarity of the direct current potential difference applied to the input side, switch through the potential of the operating current source to the trigger stage input over the impedance transformer stage to the one or the other output terminal in such a way that, over resistances provided on the collector side and connected with the input of the double current transmission circuit, a direct current of changing direction is brought about.

Advantageously, the resistances of the bridge circuit parallel to the input of the trigger stage, over an impedance member and over an impedance transformer stage, have substantially lower values in comparison with previous circuits, so that the line current losses in the bridge circuit are kept small, and on the input side correspondingly longer line length can be realized.

In a further embodiment of the invention the resistances of the bridge circuit are differently dimensioned, whereby, preferably, the resistance of the simulation current circuits is selected to be of a higher value in comparison with the resistance of the line current circuit for the purpose of reducing the loss through the simulation currents.

The present invention is of simple construction in that the impedance member used for flattening of the signal and connected in front of the impedance transformer stage is formed of capacitive and resistive circuit elements.

In a further preferred embodiment the transistor circuit of the impedance transformer stage, which is associated with the resistance of the bridge circuit energized by the single current signal, is connected with a potential limiting element which in one special case can consist of a zener diode connected between base and collector of the transistor. The zener diode prevents in case of increasing line currents the exceeding of the highest allowable base-emitter blocking voltage for the transistor, and thus, represents an effective protection against possible short circuits in the line current circuit.

The double current transmission circuit having its input connected to the output of the trigger stage preferably comprises an electronic telegraph relay. As a special advantage, a higher holding direct current is obtained over the line substitute resistance required in electronic relays in comparison to electro-magnetic relays, and consequently, loss of performance can be reduced. Correspondingly, the capacitive holding current can also be substantially reduced by other dimensioning of the holding capacitor branch, whereby a smaller volume current requirement is to be achieved.

BRIEF DESCRIPTION OF THE DRAWINGS

The invention will be best understood by reference to a description of a preferred embodiment constructed according to the principles of the invention in conjunction with the drawings in which.

DETAILED DESCRIPTION OF THE DRAWINGS

Figure 3:
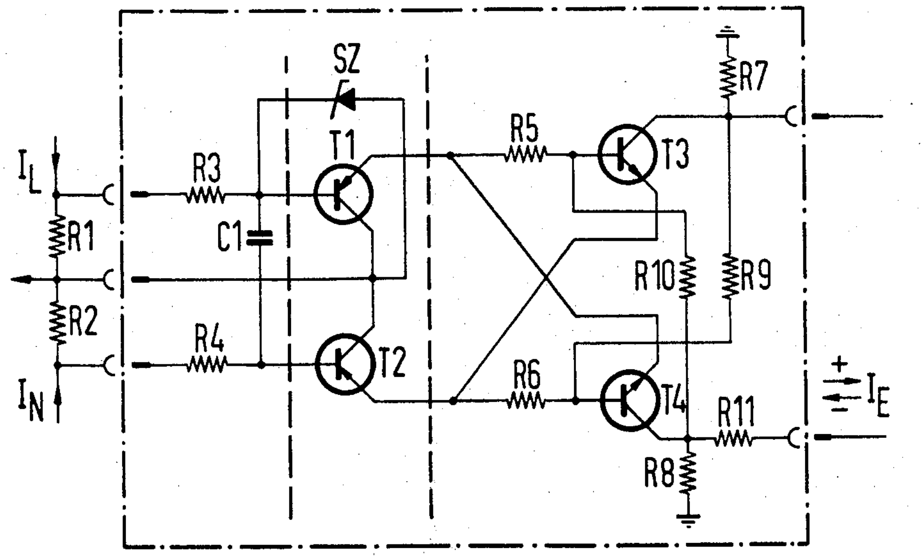
FIG. 3 is a schematic diagram of the single current-double current conversion circuit constructed according to the principles of the invention.

The manner of operation of the inventive circuit arrangement is explained in a working example shown in FIG. 3. The circuit comprises on the input side two transistors T1 and T2 in complementary common collector configurations. A transistor operated in common collector has, as is well known, the characteristic of an impedance transformer or transformation stage, whereby the output voltage has the same phase and nearly the same magnitude as the control input voltage. This results in a large input resistance and good decoupling with respect to two bridge resistances R1, R2 which carry the line current or simulation currents. In addition there arises a very small internal resistance of the control voltage source for the trigger stage. This trigger stage is constructed of two transistors and has the characteristic of a Schmitt trigger. If, for example, the emitter of transistor T1 is more positive than that of transistor T2, then a transistor T3 becomes conducting and transistor T4 is blocked or non-conducting. This process is accelerated through the feedback currents over resistances R10 and R5 or over resistances R9 and R6. If transistor T4 switches from the conducting into the blocked condition, an increased current flows over collector resistance R8 and the feedback resistance R10, which creates a voltage drop at the resistance R5. The R5 voltage drop is added to the emitter voltage of the transistor T1 in the sense that a positive feedback arises, in that the base-control current of the transistor T3 is increased. Simultaneously, the voltage drop which previously arose at the resistor R6 is reduced with the transistor T3 switched to the conducting condition, whereby switching into the blocking condition is accelerated for the transistor T4. The input of the double current transmission circuit is switched over a resistance R2 to the collectors of the transistors T3 and T4.

In front of the T1, T2 stage there is connected a symmetrical RC-member for flattening the signal thereby reducing the distrubances. A zener diode SZ connected between the base and the collector of the transistor T1 protects it from unallowable high base-emitter-blocking voltages; its allowable boundary value could otherwise be exceeded in case of too high of a difference voltage at the resistance bridge, particularly when line current $I_1$ is too high (for example as a result of grounding). The central tap of the resistance bridge is directly connected with the collectors of the transistors T1 and T2; this common connection point for the operating voltage must always have negative potential with the PNP transistors used in FIG. 3. Obviously, the situation would be reversed for NPN transistors. Because the input resistances of the T1, T2 stage are very high, it is possible to make the bridge resistances large, but of different values, and to equalize this through a reversed proportional relationship of the currents $i_l$ and $i_n$. Thereby, one can save on simulation current.

Figure 4:
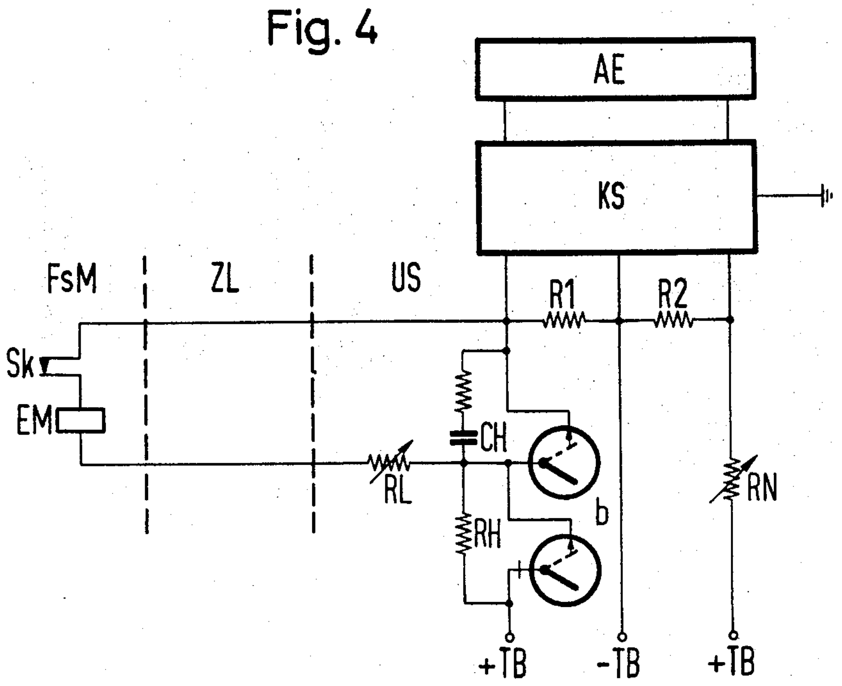
FIG. 4 is a diagram of the total conversion circuit, according to the invention, used in conjunction with an electronic telegraph relay

FIG. 4 shows a simplified total circuit for the single current double current conversion, whereby the double current transmission circuit consists of an electronic telegraph relay AE. The input side of the transistor circuit KS according to FIG. 3 is connected to the terminals of a resistance bridge with the resistances R1 and R2, the branches of which are formed by the subscriber station FsM and the two wire line ZL, and by the or simulation current circuit RN. The bridge resistances can be selected to be of very low values. In one specific example 68 ohm resistances were used. For the purpose of saving on simulation currents however, the bridge resistance R2 can be increased to, for example, 180 ohms. Thereby the required middle value of the simulation current is lowered to approximately 7.5 mA. Because of the very high input resistances (greater than or equal to 6K ohm) of the transistor circuit, this measure does not disadvantageously influence their characteristics. In contrast the bridge resistance R1 should be of low value, in order to avoid a loss of line length.

Figure 1:
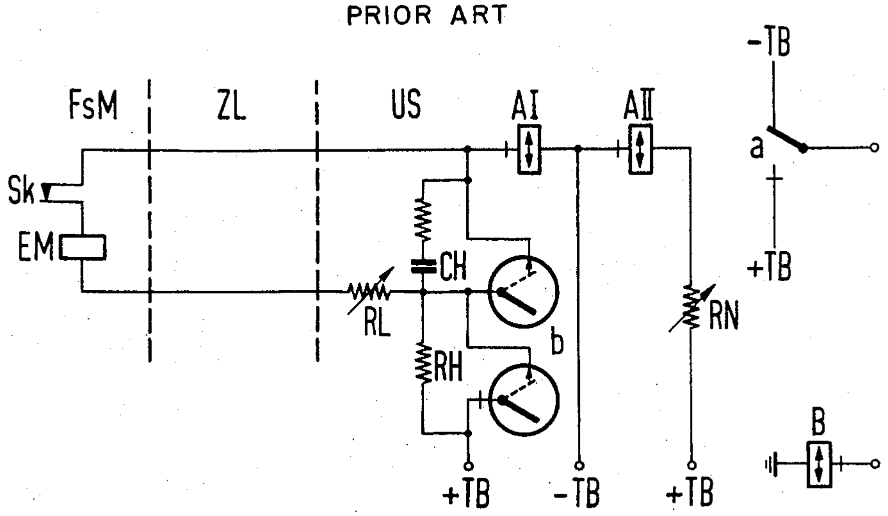
Fig. 1 PRIOR ART
FIG. 1 is a schematic diagram of the known single current-double current conversion circuit using electro-magnetic relays and described hereinabove.
Figure 2:
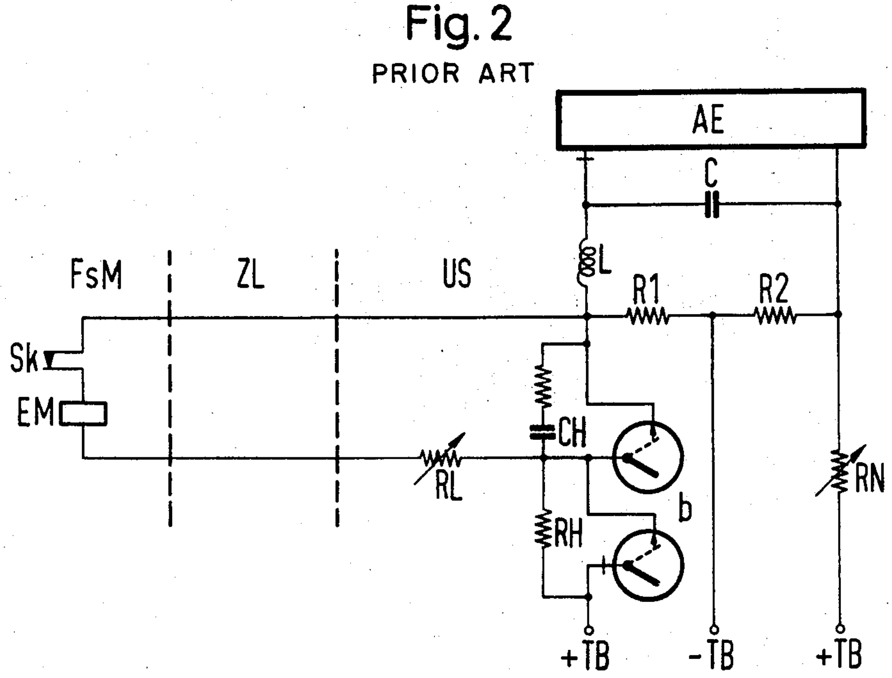
Fig. 2 PRIOR ART
FIG. 2 is a schematic diagram of a known single current-double current conversion circuit using electronic switching devices and described hereinabove.

The LC-low pass filter present in the circuit arrangement according to FIG. 2 is omitted, its function is taken over by the symmetrical RC-member in FIG. 3. With an operating voltage $U_b$ equal to 60 volts the operation of the electronic relay AE takes place with a defined square current of $I_e$ equal to plus or minus 6 mA, or $I_e$ equals plus or minus 5mA with $U_b$ equals 48 volts. This results in the relationship between the input current $I_L$ and control current $I_E$ shown in FIG. 5.

Figure 5:
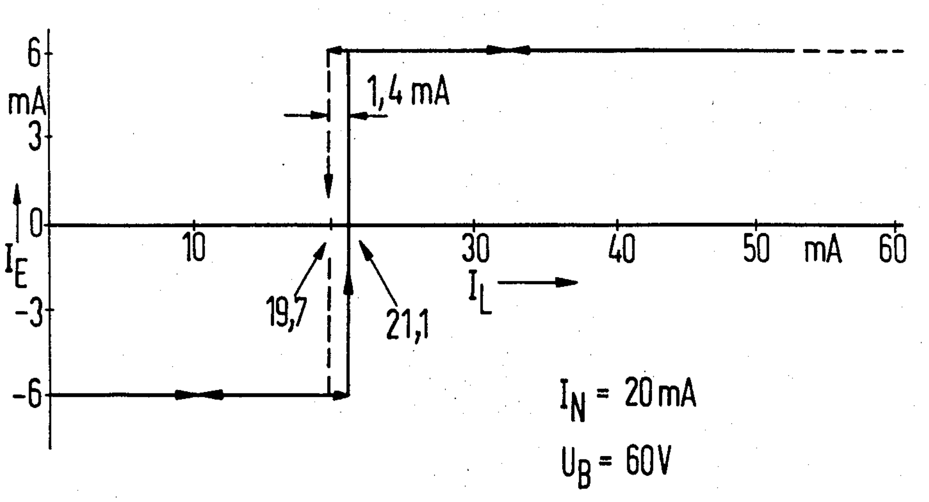
FIG. 5 is a diagram of the relationship of the input ($I_L$) and control ($I_E$) currents in an operating FIG. 3 circuit.

As shown in FIG. 5, when $I_L$ equals 0 through 21mA, the electronic relay AE connected thereafter is controlled with $I_E$ equal to negative 6mA, with $I_L$ equal to 21.1mA the triggering process steps in and their flows a control current $I_E$ equal to plus 6mA. Upon reduction of $I_L$ the transistor circuit triggers back to the original position at $I_L$ equal to 19.7 mA. The tripping safety margin is thus very large with reference to the middle value $I_L$ equals 20 mA. The slope of the leading edge of $I_E$ in the triggering process with connected relays yields values greater than or equal to 1mA/per microsecond. A switching time increase with flattened telegraph signals can thus not arise.

Because of the very great safety margin of the transistor circuit, it makes possible large ranges and small distortions. In the described working example the following line lengths were bridged, for example, with the given text distortion deltas:

85 kilometers using 1.4 millimeter cable line with 50-BD(Baud)-interruption-keying with delta less than or equal or 2.5 percent and 35 kilometers using 0.9 millimeter cable line with 200-Bd-opposite voltage keying with delta less than or equal to 6 percent.

The contact rebound safety factor in sensing from the conversion circuit to the subscriber was assured in the experimental circuit, even in case of about 30% increased simulation current. Also, a single current local transmission showed no tendency toward instability. For both the holding direct current over the line substitute resistance RH as well as capacitive holding current over the holding condenser CH 40mA was used, at a value of the capacitance ZH of 0.68 microfarads.

The circuit described above as a working example of the invention proved itself to be practically independent of fluctuations of the operating voltage (plus or minus 10 percent) and of the ambient temperature (up to plus 80° centigrade) because of its completely symmetrical construction. Additional control operations (for example busy signal-signalling) can be carried out simply and with small control currents because of the high input resistance of the trigger circuit.

The preferred embodiment of the invention described hereinabove is intended only to be exemplary of the principles of the invention and in no way limiting on the scope of the invention as defined by the appended claims.

I claim:

1. Apparatus for converting single current telegraphy signals to double current signals for operating a double current telegraphy transmission circuit, comprising:

input means formed as a bridge circuit and including first and second series connected resistances and subscriber station apparatus, voltages of a given polarity appearing at the ends of said series connection of resistances, impedance transformation means having a high input impedance relative to the impedances of said first and second resistances and thereby high sensitivity, said impedance transformation means having input terminals connected to the ends of said series connection of said first and second resistances, output load means and bistable trigger means having outputs connected to said output load means for producing therein and in said double current transmission circuit direct current signals of changing polarity by switching through said given polarity of an operating current source responsive to a given polarity applied to said input means, said bistable trigger circuit having inputs connected to outputs of said impedance transformation means, said bistable trigger circuit, through said impedance transformation means, being connected in parallel with said series connection of said first and second resistances.

2. The apparatus defined in claim 1 wherein said first and second resistances are of sufficiently low values as not to materially affect the lengths of transmission line which can be connected thereto.

3. The apparatus defined in claim 1 having an operating current source connected across one of said resistances and wherein said impedance transformation means comprises:

a pair of common collector transistor circuits, each having a control electrode input connected across a different one of said resistances with the collectors of the circuits being connected in common to the junction of said resistances.

4. The apparatus defined in claim 3 wherein one of said transistors has a voltage limiting element connected between collector and base.

5. The apparatus defined in claim 1 wherein said bistable trigger circuit comprises:

a pair of symmetrically-constructed transistor circuits, each transistor having a control electrode and a pair of electrodes at the ends of a conducting path each control electrode input being connected to a different side of the output of said impedance transformer, one of said conducting path electrodes of each transistor being connected to the control electrode input of the other transistor, said output load means being connected across the other of said conducting path electrodes.

6. The apparatus defined in claim 1 wherein said resistances are of different values.

7. The apparatus defined in claim 1 wherein said impedance transformation means is connected to opposite sides of said connected first and second resistances by series resistors, a capacitor being connected across said impedance transformation means connection.

* * * * *